(No Model.)
D. W. PAYNE & C. R. WILLIAMS.
GOVERNOR OR SHIFTING ECCENTRIC.
No. 294,070. Patented Feb. 26, 1884.
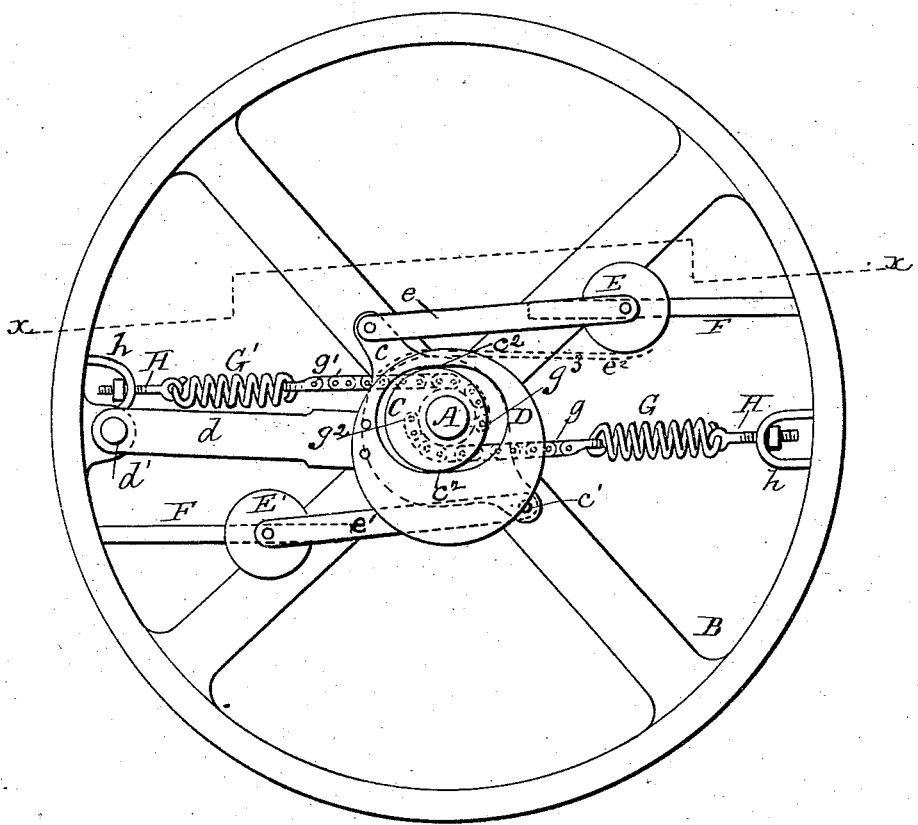
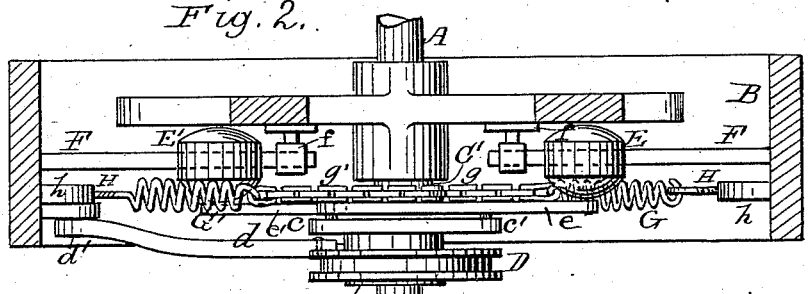
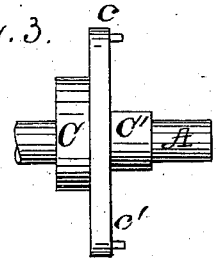
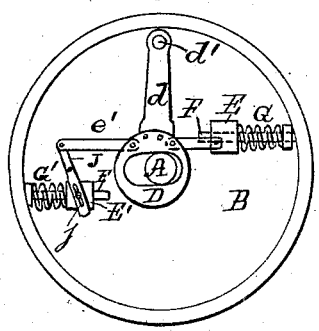
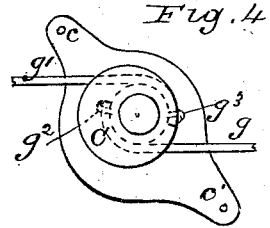
Witnesses:
E. E. Masson
L. C. Hills
Inventors:
D. W. Payne & C. R. Williams
By E. B. Stoetting
Atty

UNITED STATES PATENT OFFICE.

DAVID W. PAYNE AND CHARLES R. WILLIAMS, OF CORNING, NEW YORK, ASSIGNORS TO B. W. PAYNE & SONS, OF SAME PLACE.

GOVERNOR OR SHIFTING ECCENTRIC.

SPECIFICATION forming part of Letters Patent No. 294,070, dated February 26, 1884.

Application filed July 5, 1883. (No model.)

*To all whom it may concern:*

Be it known that we, DAVID W. PAYNE and CHARLES R. WILLIAMS, citizens of the United States, residing at Corning, in the county of Steuben and State of New York, have invented certain new and useful Improvements in Steam-Governors or Shifting Eccentrics, of which the following is a specification, reference being had therein to the accompanying drawings.

Our invention relates to that class of steam-governors in which centrifugal force in revolving counterbalanced weights connected by suitable means with the main or valve-governing eccentric is utilized, so that variations in the speed of rotation of the fly-wheel and of the shaft upon which it is mounted automatically varies the supply of steam to the cylinder, whereby uniformity of operation in the engine is secured, and it is adapted to meet the requirements of variations in its load or work. Heretofore said weights, one or more, have been pivotally secured to the wheel, so as to be capable of swinging freely as pendulous weights, and suitable connecting-links have been secured between the weight and its pivot to its supporting-arm, and to suitable means for causing the main eccentric to be moved laterally in its relation to the shaft, so that as the weights swing outwardly by centrifugal force the eccentric, through the medium of the usual connecting-rod, partially shuts off the supply of steam, whereby the engine is slowed down. In practice such constructions are lacking in sensitiveness and serviceability by reason of the number of parts employed, the friction existing between them, especially between the weight-supporting arm and its pivot, and the necessity of using counterbalancing-springs of very high tension on account of the excessive strain upon them when the speed of rotation is high.

The object of our invention is to overcome these objections and so construct a governor that, instead of using heavy springs of great tension, we may use lighter springs of lighter tension and greater extension; and instead of overcoming the immense centrifugal force exerted in the weight or weights and the friction and wear produced by it by a simple pivot, the bearing-surface of which is comparatively limited, we diffuse said friction and wear over an extended bearing; and we also dispose said bearing in the best possible position relative to the direction which a weight so influenced would naturally assume during the revolution of the wheel.

In an embodiment of our invention we employ the following instrumentalities.

Referring to the drawings, Figure 1 is a side elevation of a steam-governor constructed in accordance with our invention. Fig. 2 is a plan, the wheel being in section on the line $x$, Fig. 1; Fig. 3, an edge view of the inner eccentric and its adjuncts; Fig. 4, an elevation of the same, and Fig. 5 a modified arrangement of the principal elements.

Like letters indicate like parts in all the figures.

A represents the main or crank shaft of an engine, upon which the fly-wheel (or it may be a disk) B is rigidly mounted.

C represents an inner or secondary eccentric, and D the outer, main, primary, or valve-operating eccentric, which is connected with the valve by any usual and well-known mechanism. The inner eccentric comprises the following adjuncts, which may be integral therewith, as shown, or formed separately and secured thereto, as desired—a hub, C', adapted to fit the shaft A, so as to rotate thereon, and two diametrically or otherwise opposite lugs, $c\ c'$. The outer eccentric, D, is provided with an arm, $d$, pivoted to the wheel or disk at $d'$, and is apertured in the line of suspension for the reception of the inner eccentric, C, which touches it at two points, $c^2\ c^2$, only, and constantly, in order to insure smoothness in operation. These features of construction in the outer eccentric are not claimed herein, as they are embraced in a previous application (Serial No. 86,106) filed by us.

From the lug $c$ a link, $e$, extends to a weight, E, and from the lug $c'$ another link, $e'$, extends to another weight, E'. Each link is pivotally secured to the lug and the weight, and each weight is adapted to ride or slide upon a straight guide, F, firmly seated in the rim; or it may be in any other portion of the wheel, or any disk adapted to coact with the elements as does the wheel B. The guides F project squarely within the area of the wheel, in contradistinction to a radial disposition of weight-guides as heretofore constructed; and we deem the disposition herein shown of the guides an essential and valuable feature of our invention, for reasons hereinafter stated. Brackets $f$ may or may not, as desired, be employed to support the inner ends of the guides.

To the hub C' are secured two flexible bands, straps, or chains, $g\ g'$—the former at $g^2$ on one side and passing therefrom in one direction—and the latter at $g^3$ on the opposite side and passing therefrom in the opposite direction, and each is secured to a spring, G G', respectively, which springs are adjustably connected by an eyebolt, H, to a bracket, $h$, secured to, or it may be formed on or in, the wheel.

In Fig. 5 we have illustrated one application of our invention to a steam-governor comprising a single eccentric having a slot across the line of suspension, to show that advantages may be secured by modified uses of our method of construction and arrangement of the principal elements, which uses we deem as fully comprehended by our invention. In this illustration the link $e'$ is connected to an intermediate pivoted link or lever, J, which is connected to the weight E' by a pin and slot, $j$, or it may be by a third link, which will allow the lever to pass its center of motion. In this illustration the springs act as compression-springs; but, if desired, they may act as contractile springs, as shown in Fig. 1. We do not limit ourselves to the use of either character of springs, as other springs of C, elliptical, or any other form may be adopted, if desired.

The operation is as follows: Variations in the speed of the rotation of the wheel or disk B causes the weights to slide upon the guides F, increased speed causing them to move outwardly from the center, and decreased speed permitting the counterbalancing - springs to force them inwardly toward the center. When moving outwardly, their motion is communicated to the links, and these in turn draw on the lugs $c\ c'$, and thus the inner eccentric is caused to rotate or partially rotate upon the shaft, and the outer eccentric is thereby moved in a line crossing the shaft, so as to vary the throw of the valve, as usual. When the inner eccentric is rotated by an outward movement of the weights, as described, the flexible bands, straps, or chains are wound up on the hub C', the springs G G' extending in proportion to the extent of rotation; and as the speed decreases the tension of the springs overcomes the weights and draws them inwardly until the centrifugal force and the tension of the springs are equally exerted upon the weights.

It will be seen that instead of sustaining the entire strain of the weight on a single pivot at the end of an arm supporting the weight, as heretofore, we provide a long bearing-surface arranged squarely within the wheel, upon which bearing the weight slides, and as the centrifugal force, and therefore the friction and strain of the weight, is greatest when the speed is highest, the weight is at such times at a stronger portion of or point on the guide. Taking a pendulous weight at its place of rest and at the extreme point of its outward movement, and drawing a line from the rim of the wheel or disk, which passes through the center of the weight at each of said positions, we establish what we deem the best practical disposition of our guide—that is, the best line in or on which to place the guide. Such disposition we have herein designated as projecting squarely into the area of the wheel or disk, and intend such designation to mean any line produced as above stated, and any line similarly produced in contradistinction to a purely radial or to a curved line. We dispose our guides in straight lines other than radial.

Although we have described and illustrated our weights and guides as contained wholly within the area of the wheel, we wish to be understood as not limiting ourselves in this respect, as the weights and guides may extend beyond the rims of the wheel or disk; nor do we confine ourselves to the use of two eccentrics, as it is apparent that the outer eccentric may be removed and the remaining elements employed for operating a riding cut-off valve.

Instead of the rigid links $e\ e'$, we may use flexible straps, bands, or chains, as indicated by dotted line $e^2$, Fig. 1, in which case the lugs $c\ c'$ would be adapted to support the flexible connection, if desired, on their peripheries, as or similar to the arrangement of the bands or chains $g\ g'$.

Having described our invention, what we claim is—

1. In a steam-governor, a weight or weights adapted to be influenced by centrifugal force, and a guide or guides for the same arranged squarely within the area of the governor or its described equivalent area, substantially as specified.

2. In a steam-governor, a shifting eccentric connected with and operated by a weight or weights mounted upon straight guides arranged squarely within the area of the wheel or disk, substantially as specified.

3. The combination of a suspended shifting eccentric, a weight or weights arranged to slide upon a straight guide or guides arranged in or on other than radial lines, connecting links, bands, or chains, and a counterbalancing spring or springs, substantially as specified.

4. The combination of a shifting outer eccentric, an inner eccentric, and links secured to the latter and to weights adapted to slide upon straight guides arranged on other than radial lines, substantially as specified.

5. In a steam-governor, the combination of an eccentric, a counterbalancing-spring, and a flexible connecting band or strap, substantially as specified.

6. In a steam-governor, the combination of an inner eccentric, and an outer eccentric operated thereby by means of centrifugal weights, with counterbalancing-springs connected to said inner eccentric by flexible means, substantially as specified.

7. The combination of the eccentric D, links $e$ $e'$, weights E E', and straight guides F, arranged as described, with means for counterbalancing the weights, substantially as specified.

8. The combination of the eccentrics C D, springs G G', links $e$ $e'$, weights E E', straight guides F, wheel B, and shaft A, substantially as shown and described.

9. The combination of the suspended outer eccentric, D, inner eccentric, C, having hub C' and lugs $c$ $c'$, the bands, straps, or chains $g$ $g'$, springs G G', bolts H, brackets $h$, links $e$ $e'$, weights E E', guides F, wheel B, and shaft A, substantially as shown and described.

In testimony whereof we affix our signatures in presence of two witnesses.

DAVID W. PAYNE.
CHARLES R. WILLIAMS.

Witnesses:
E. C. POND,
GEO. S. MARX.